May 13, 1930.  A. W. WHEATON  1,758,419
VALVE
Filed May 15, 1929
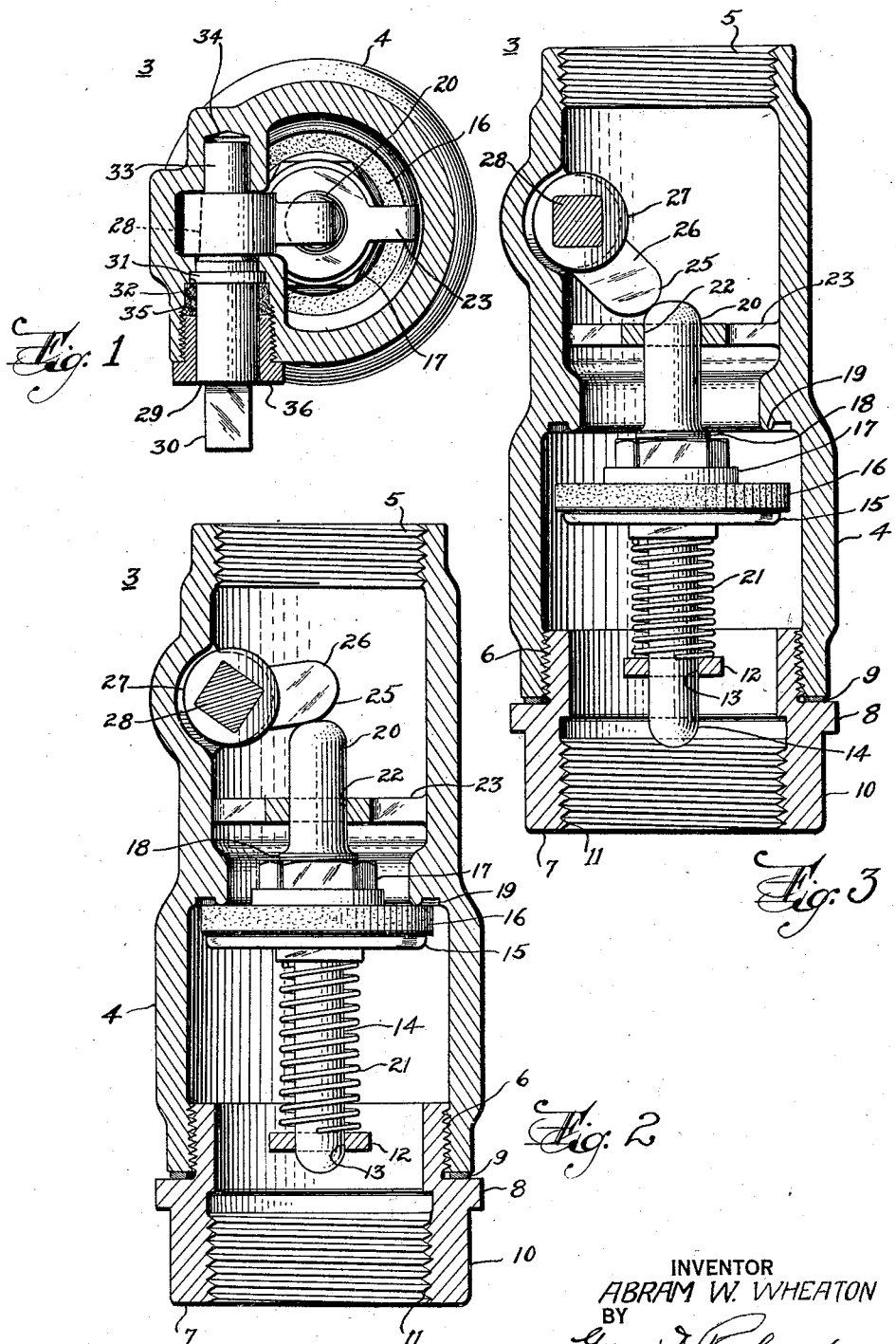
INVENTOR
ABRAM W. WHEATON
BY
ATTORNEY Patented May 13, 1930

1,758,419

UNITED STATES PATENT OFFICE

ABRAM W. WHEATON, OF MAPLEWOOD, NEW JERSEY, ASSIGNOR TO A. W. WHEATON BRASS WORKS, OF NEWARK, NEW JERSEY, A CORPORATION OF NEW JERSEY

VALVE

Application filed May 15, 1929. Serial No. 363,146.

This invention relates, generally, to valves; and the invention has reference, more particularly, to a novel quick operating valve for controlling the flow of fluid through pipes.

The principal object of the present invention is to provide a novel valve that is especially adapted for use in connection with pipes or pipe lines, which valve is of the disk type and is so constructed and arranged as to be biased to closed position, said valve comprising a simple quick operating cam mechanism for effecting the opening movement of the same, said cam mechanism having a dead center position for retaining the valve in its open position.

Another object of the present invention lies in the provision of a valve of the above character which is of simple construction, reliable in operation and easily and quickly operated.

Other objects of this invention not at this time more particularly enumerated, will be clearly understood from the following detailed description of the same.

The invention is clearly illustrated in the accompanying drawings, in which:—

Fig. 1 is a transverse sectional view through the novel valve of this invention;

Fig. 2 is a longitudinal sectional view of the valve of Fig. 1 and illustrates the valve in closed position; and Fig. 3 is a view similar to Fig. 2 but illustrates the valve in open position.

Similar characters of reference are employed in all of the hereinabove described views, to indicate corresponding parts.

Referring now to the said drawings, the reference numeral 3 designates the novel quick operating valve of this invention. Valve 3 comprises a valve casing 4 of substantially cylindrical shape that is provided at its ends with internal threaded portions 5 and 6. Threaded portion 5 is adapted to receive an adjoining pipe section, while a union 7 is screwed into the threaded portion 6. Union 7 is formed with an annular flange 8 that is adapted to press a gasket 9 against the end of valve casing 4 to thereby secure a fluid tight joint between the valve casing and union. The exterior surface 10 of the outer portion of the union 7 is suitably shaped to receive a wrench while the inner surface of this portion of the union is threaded at 11 for receiving an adjoining pipe section.

Union 7 is formed interiorly with a bridge-piece 12 extending diametrically between opposite inner walls of the union. Bridge-piece 12 is provided with a circular guide aperture 13 extending centrally and longitudinally of the union and valve casing. Guide aperture 13 slidingly receives the valve stem 14 of a valve disk 15. Valve disk 15 is provided with a face-washer 16 of suitable material such as rubber. Face-washer 16 is retained upon valve disk 15 by a nut 17 threaded upon a central boss 18 provided on the valve disk 15. Face-washer 16 is adapted to cooperate with an annular beaded valve seat 19 formed on the valve casing 4. A compression spring 21 surrounds the valve stem 14 and by pressing at one end against the bridge-piece 12 and at its other end against the valve disk 15, tends to urge the face-washer 16 carried by the valve disk against the valve seat 19 to close valve 3.

Boss 18 has a reduced cylindrical extension or pressure piece 20 that extends axially within the valve casing and is aligned with valve stem 14. Pressure piece 20 projects through a guide aperture 22 provided in a bridge piece 23 that extends diametrically between the inner walls of the valve casing 4. The free end of pressure piece 20 is illustrated as being beveled or rounded and is normally engaged by the curved working face 25 of an operating cam 26. Operating cam 26 is provided with a hub 27 having a central tapered recess of square cross-section through which the square portion 28 of a rotatable cam shaft 29 extends. Shaft 29 extends outwardly of casing 4 and has a square end portion 30 for receiving a wrench. An annular positioning flange 31 is formed on cam shaft 29 and is rotatably positioned within a corresponding recess 32 provided in casing 4. The inner end portion 33 of shaft 29 is of reduced diameter and has a bearing in a recess 34 provided in casing 4. Packing 35 surrounding shaft 29 is retained by a packing gland 36 and is adapted to seal the joint between shaft 29 and casing 4.

In operation, assuming the novel quick operating valve to be in its closed position as shown in Fig. 2, then to open the valve, a suitable handle or wrench applied to the square end portion 30 of shaft 29 may be used to turn this shaft in a clockwise direction, as viewed in Fig. 2. As shaft 29 starts to turn, operating cam 26 also turns, causing its working face 25 to depress the pressure piece 20 against the tension of spring 21. Pressure piece 20, valve disk 15 and valve stem 14, forming a single unitary structure, are thus caused to move longitudinally within valve casing 4, being guided by bridge-pieces 23 and 12. This motion results in a quick separation of face-washer 16 from valve seat 19 and in a rapid opening of the valve 3. Continued turning of shaft 29 and of cam 26 brings this cam into the position shown in Fig. 3, in which position, the dead center relationship obtaining between cam 26 and pressure piece 20 prevents the return movement of pressure piece 20 even though this member is urged upwardly by spring 21. The bridge-piece 23 acts to limit the downward swinging movement of cam 26. The valve 3 is thus held in its fully opened position by the action of cam 26.

To close the valve 3, it is merely necessary to turn shaft 29 in the reverse direction, or counterclockwise as viewed in Fig. 3, whereupon the spring 21 will act to instantly force the face-washer 16 against seat 19 thereby closing the valve.

It will be noted that shaft 29 has merely to be turned through a portion of a revolution to either open or close the valve either of which operations may be performed in a moment's time.

Owing to the positioning of the operating cam 26 and pressure piece 20 in dead center relation when the valve is in its open position, the valve disk 15 is positively retained or locked in such open position until cam 26 is operated to effect the closure of the same.

It will be noted that the novel valve of this invention is of extremely simple and sturdy construction and has an extremely long life in actual use.

As many changes could be made in the above construction and many apparently widely different embodiments of this invention could be made without departing from the scope thereof, it is intended that all matter contained in the above description or shown in the accompanying drawings, shall be interpreted as illustrative and not in a limiting sense.

What is claimed is:—

1. A valve of the class described comprising, a casing having an internal valve seat, a valve disk movable within said casing and adapted to engage said seat to close said valve, said valve disk having a valve stem and a pressure piece extending in opposite directions therefrom, means within said casing for guiding said valve stem and said pressure piece to thereby control the line of movement of said valve disk, a cam shaft and an operating cam splined on said cam shaft and adapted to cooperate with said pressure piece, said cam shaft being operable to rotate said operating cam to effect the movement of said valve disk to open position, said operating cam and said pressure piece being so constructed and arranged as to retain said valve disk in open position.

2. A valve of the class described comprising, a casing having an internal valve seat, a valve disk movable within said casing and adapted to engage said seat to close said valve, said valve disk having a valve stem and a pressure piece extending in opposite directions therefrom, means within said casing for guiding said valve stem and said pressure piece to thereby control the line of movement of said valve disk, a compression spring surrounding said valve stem and acting between said guide means and said valve disk for biasing said valve disk to closed position, a cam shaft and an operating cam splined on said cam shaft and adapted to cooperate with said pressure piece, said cam shaft being operable to rotate said operating cam to effect the movement of said valve disk to open position, said operating cam and said pressure piece being so constructed and arranged as to retain said valve disk in open position.

3. A valve of the class described comprising, a casing having an internal valve seat, a valve disk movable within said casing and adapted to engage said seat to close said valve, said valve disk having a valve stem and a pressure piece extending in opposite directions therefrom, a union threaded into said casing, said union having means for guiding said valve stem to control the line of movement of said valve disk, a cam shaft and an operating cam splined on said cam shaft and adapted to cooperate with said pressure piece, said cam shaft being operable to rotate said operating cam to effect the movement of said valve disk to open position, said operating cam and said pressure piece being so constructed and arranged as to retain said valve disk in open position.

4. A valve of the class described comprising, a casing having an internal valve seat, a valve disk movable within said casing and adapted to engage said seat to close said valve, said valve disk having a valve stem and a pressure piece extending in opposite directions therefrom, a union threaded into said casing, said union having means for guiding said valve stem, a bridge-piece extending between the inner walls of said casing and having an aperture for guiding said pressure-piece, said union guide means and said bridge-piece acting to control the line of movement of said valve disk, a compression spring surrounding said valve stem and acting between said union guide means and said valve disk for biasing said valve disk to closed position, a cam shaft and an operating cam splined on said cam shaft and adapted to cooperate with said pressure piece, said cam shaft being operable to rotate said operating cam to effect the movement of said valve disk to open position, said operating cam and said pressure piece being so constructed and arranged as to retain said valve disk in open position.

In testimony that I claim the invention set forth above I have hereunto set my hand this 4th day of May, 1929.

ABRAM W. WHEATON.